United States Patent
Nichols et al.

(10) Patent No.: US 6,889,294 B1
(45) Date of Patent: May 3, 2005

(54) VIRTUAL SHARED VOLUME VIA PROXY DATA TRANSFER

(75) Inventors: Charles E. Nichols, Wichita, KS (US); Keith W. Holt, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 485 days.

(21) Appl. No.: 10/029,759

(22) Filed: Oct. 29, 2001

(51) Int. Cl.[7] .............................................. G06F 12/00
(52) U.S. Cl. ...................... 711/147; 711/142; 711/143; 711/165; 707/10; 709/214; 709/216; 710/56; 714/6
(58) Field of Search ................... 711/118–119, 121, 711/113, 130, 137, 150–151, 162, 165, 114, 133, 147, 142–143; 714/5–6; 707/10, 204; 710/316–317, 56; 709/214, 216; 345/532, 535, 541

(56) References Cited

U.S. PATENT DOCUMENTS

| | | | |
|---|---|---|---|
| 5,606,706 A | * | 2/1997 | Takamoto et al. ........... 711/100 |
| 5,640,530 A | * | 6/1997 | Beardsley et al. ........... 711/113 |
| 5,742,792 A | | 4/1998 | Yanai et al. |
| 5,895,485 A | * | 4/1999 | Loechel et al. ............. 711/119 |
| 6,044,444 A | * | 3/2000 | Ofek ........................... 711/162 |
| 6,085,333 A | | 7/2000 | DeKoning et al. |
| 6,101,497 A | | 8/2000 | Ofek |
| 6,219,751 B1 | | 4/2001 | Hodges |
| 6,321,298 B1 | | 11/2001 | Hubis |
| 6,349,357 B1 | | 2/2002 | Chong, Jr. |
| 6,442,551 B1 | * | 8/2002 | Ofek ............................ 707/10 |
| 6,557,079 B1 | * | 4/2003 | Mason et al. ............... 711/137 |

* cited by examiner

*Primary Examiner*—Pierre M. Vital
(74) *Attorney, Agent, or Firm*—Suiter West PC LLO

(57) ABSTRACT

A switched architecture for dual, independent storage controllers overcomes latency and coherency problems by an inter-controller command interchange scheme. The switched architecture permits a read or write command to be presented to either storage controller to effect data transfer on the same or the other storage controller. Communication between the two storage controllers is effected through internal Infiniband switches.

2 Claims, 3 Drawing Sheets

Switched Controller Architecture

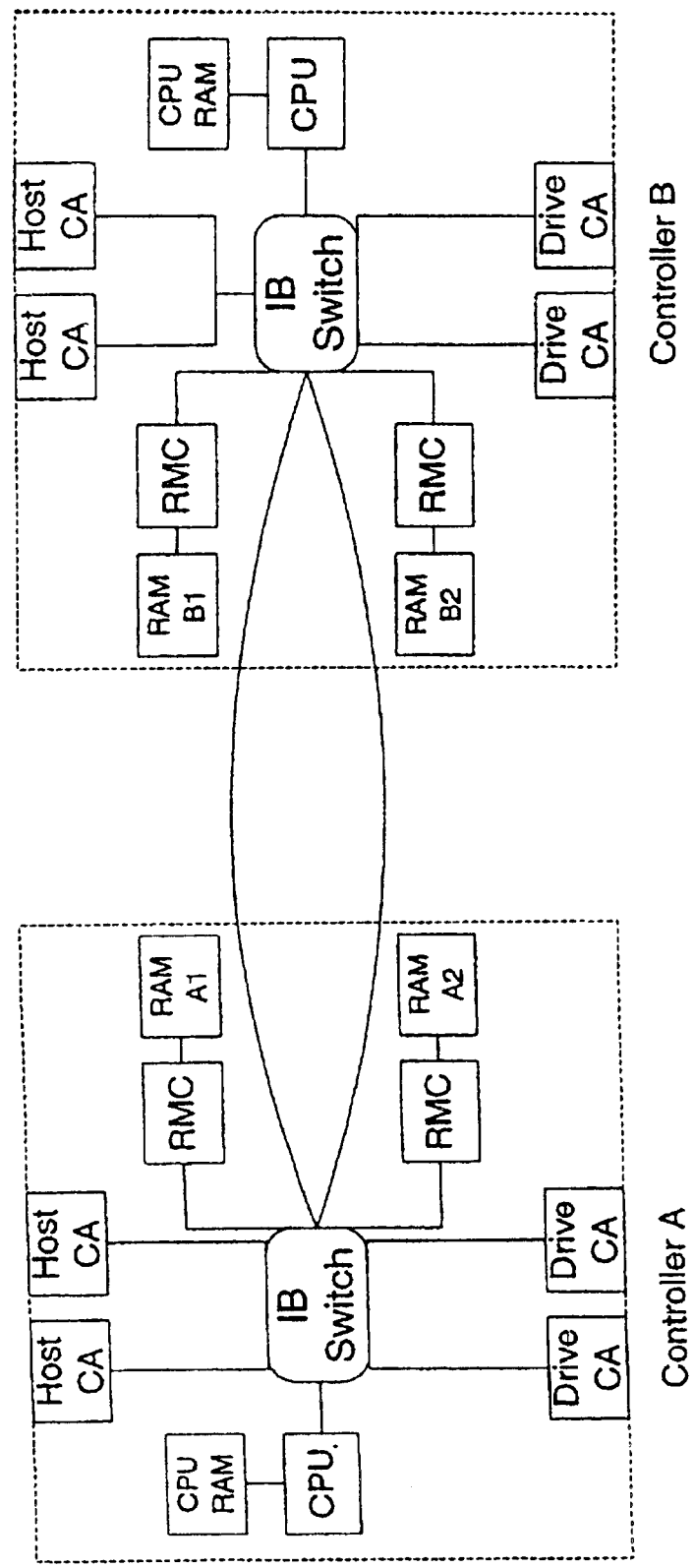
Figure 1. Switched Controller Architecture

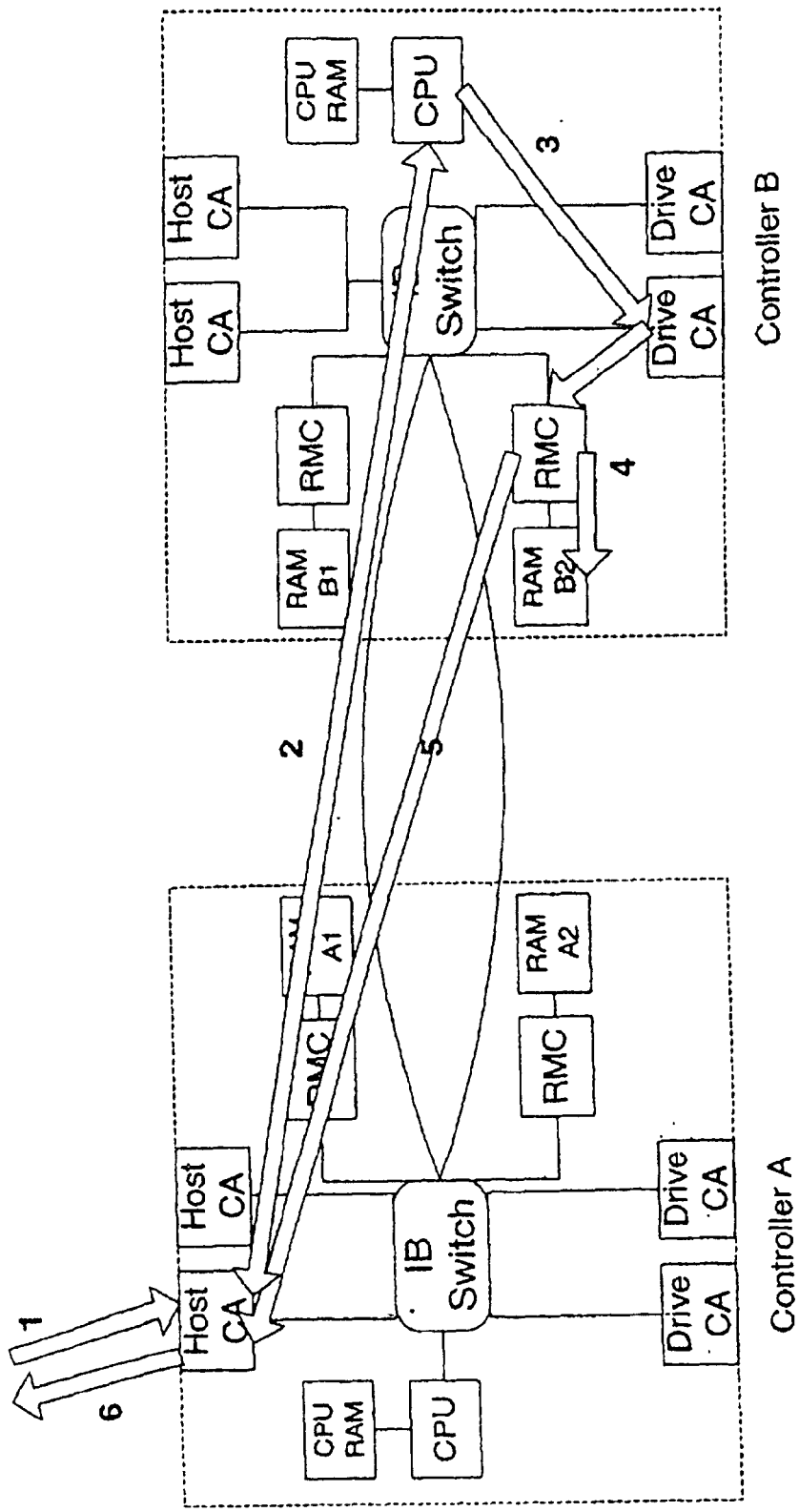
Figure 2. Proxy Data Transfer Read Sequence

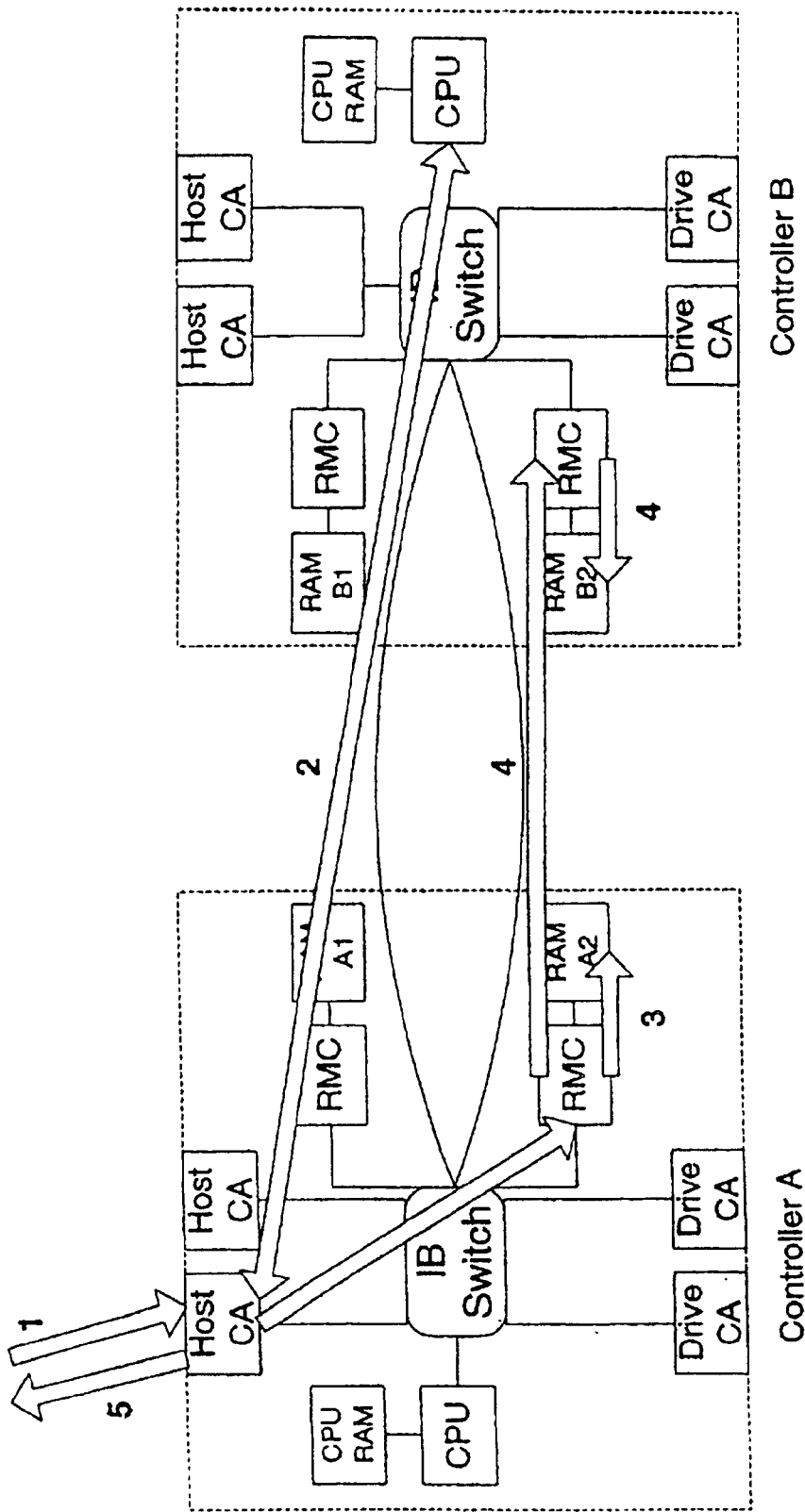
Figure 3. Proxy Data Transfer Write Sequence

VIRTUAL SHARED VOLUME VIA PROXY DATA TRANSFER

FIELD OF THE INVENTION

The present invention generally relates to the field of computer communications, and particularly to a switched architecture for dual, independent storage controllers.

BACKGROUND OF THE INVENTION

Computer storage systems often have dual, independent storage controllers for redundancy along with a number of disk drives. Dual, independent storage controllers are required to provide full data path redundancy to host computer systems. The controllers share access to the disk drives via their redundancy to host computer systems. The controllers share access to the disk drives via their respective drive ports. The respective host port connections may be connected to the same or different host systems. The controllers present the data on the drives to one or more host systems as one or more logical drive volumes.

Two major problems arise with using dual, independent storage controllers: coherency and latency. Coherency implies that the data in two or more memory locations is consistent and equivalent. Coherency problems arise since each controller has an independent memory system for caching data from the volumes. Latency is the time required to access data not including the actual transfer time. Data access latency problems arise since the controllers must make their respective caches coherent when the two controllers interleave access to the data in the volumes.

There are broadly three main solutions that have been devised to overcome these problems.

The first solution is to disallow multiple hosts from simultaneously accessing data. Memory requests from the hosts are queued or arbitrated by a processor to ensure only one host's access to memory at a given time. This solution restricts simultaneous data access by hosts connected to a single controller.

The second solution involves the two storage controllers sharing a common data cache between the controllers. Data may be simultaneously shared by the two storage controllers. A disadvantage of this approach is that the shared data cache is a single point of failure.

The third solution implements an ownership model which assigns to multiple controllers the ability to trade off data access privileges regarding data. Ownership entails permission to retrieve and alter data. A storage controller must initiate a request to obtain ownership of data before it can process the data. Ownership of data must be given when ownership of the data is requested by the storage controller. Only one controller may own a data block at any given moment. A disadvantage to this approach is that there are latencies associated with the ownership transfer. These latencies are visible to the host computer systems.

Because of the great increases in I/O requirements, present day bus-based I/O architectures such as PCI or PCI-X are becoming inadequate. Infiniband is an I/O specification to provide a channel based, switched fabric technology for computer systems that provides a scalable performance range of 500 MB/s to 6 GB/s per link to optimize I/O communications and provide adequate interfacing between known standards such as PCI and PCI-X. The specification is designed to provide scalability to satisfy the increasing demands of computer groups and flexibility to provide connectivity for various sized businesses independent of operating systems and computer and interoperational flexibility. InfiniBand devices are compatible with a broad range of existing hardware devices and software operating systems for easier upgrading. InfiniBand is designed to connect servers with remote storage and networking devices as well as other servers. It is also designed for internal communication within servers.

Therefore, it would be desirable to provide a data storage controller architecture which offers coherency and avoids data access latency problems associated with simultaneous or interleaved data access to data on a given volume from two controllers. It would be desirable to utilize a high-speed switching mechanism, such as Infiniband, to achieve these goals.

SUMMARY OF THE INVENTION

Accordingly, the present invention is directed to solving coherency and data access latency problems associated with simultaneous or interleaved access to data on a given volume from the two controllers.

From the host computers' perspective, the strict ownership model has been eliminated. However, from the storage controllers' perspective, there is still a "preferred" access path to the storage. That is, only one controller at a given time is responsible for cache coherency.

In a first aspect of the present invention, a computer storage retrieval system includes one or more host computers and at least two independent storage controllers, each controller having its own independent data cache and each controller being separate from the host computer, in which a read or write command from the host computer to either controller will result in the access of either controller's associated independent memory.

In a second aspect of the present invention, a method for processing a data transfer read request issued by a host computer or external device to one of first and second independent storage controllers, includes the steps of sending a read request to a host channel adaptor of the first storage controller, determining whether the read request is directed to a volume associated with the first storage controller or the second storage controller, and, if it is determined that the read request is directed to a volume associated with the second storage controller, routing the read request from the first storage controller to the second storage controller.

In a third aspect of the present invention, a method of processing a data transfer write request issued by a host computer or external device to one of first and second independent storage controllers, comprising the steps of sending a write request to a host channel adaptor of the first storage controller, determining whether the write request is directed to a volume associated with the first storage controller or the second storage controller, and, if it is determined that the write request is directed to a volume associated with the second storage controller, routing the write request from the first storage controller to the second storage controller.

In this invention, the associated memory of all remote memory controllers is accessible by all other remote memory controllers, host channel adapters, and drive channel adapters; that is, independent memory systems can be directly accessed by any other component within the storage array.

This invention utilizes two or more controllers' switched architecture to facilitate direct data transfers to components that are not "on board" with respect to a single controller. Data is transferred to, or received from, the host via the host channel adaptor that received the command, regardless of which controller processes the request.

This invention offers the following advantages over existing solutions to simultaneous of or interleaved data access by two or more controllers. From a host perspective, it eliminates a strict ownership model within a redundant controller storage environment. A host can access data from either storage controller without being exposed to the ownership change latency associated with moving ownership between controllers. It allows for cache coherency management on a single controller.

It is to be understood that both the forgoing foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates a switched controller architecture of the present invention;

FIG. 2 illustrates a proxy data transfer read sequence of the present invention; and FIG. 3 illustrates a proxy data transfer write sequence of the present invention.

DETAILED DESCRIPTION OF THE INVENTION

Reference will now be made in detail to the presently preferred embodiments of the invention, examples of which are illustrated in the accompanying drawings.

Referring generally now to FIGS. 1 through 3, exemplary embodiments of the present invention are shown.

FIG. 1 shows a switched architecture to allow controllers to proxy data transfers. The switched architecture uses packet switching and is controlled by host channel adaptors and drive channel adaptors to provide for conventional server I/O and inter-processor communication within parallel clusters. Each controller has an Infiniband switch, IB switch, which is a device that routes IB data packets from one IB node (microprocessor, host channel adaptor, drive channel adaptor, remote memory controller) to another. The Infiniband switch does not directly control the storage controller; rather, it's the physical device that connects all elements of an IB network. The IB switch directly communicates with internal remote controller memories RMC, host channel adaptors Host CA, drive channel adaptors Drive CA, and a generic microprocessor CPU. A generic channel adaptor (host or drive) is a device that terminates an IB link and performs the IB transport-level functions. Generically, it can connect one IB link to another or, with the appropriate hardware, can connect and translate between IB and another interface type (SCSI, Fibre-Channel, etc.). The remote controller memory RMC reads from and writes to its corresponding generic random access memory RAM A1 or RAM A2. The microprocessor CPU accesses a CPU RAM for its memory needs. The drive channel adaptors Drive CA interface with mass storage memory devices.

The switched controller architecture of the present invention has several properties. Within a single controller, all memory systems and I/O processors are connected through a switch. The switched architecture allows for inter-controller access to memory systems and I/O interfaces in a redundant controller environment. The controller memory systems are independent of each other. Cache coherency is maintained by a single controller. The responsibility for the coherency management is established at configuration time, stored in a non-volatile manner, and can be moved from controller to controller for load balancing or due to a failed controller. There is no strict "ownership", from the host computer's perspective, to determine data access. Access is managed by the controller in the pair responsible for cache coherency. Cached write data is mirrored between redundant controllers.

A read/write I/O received by the controller responsible for managing cache coherency (preferred path) is managed completely within that controller. This description enumerates the I/O sequence when a command is received by a controller that in not the current preferred path to the storage.

FIG. 2 shows a proxy data transfer read sequence. Initially, in step 1, a read request from a host computer or other device directed to a storage volume currently managed by Controller B is received by Controller A through a host channel adaptor Host CA. In step 2, the read request is routed from Controller A to Controller B. Controller B assumes responsibility for managing this request. In step 3, Controller B allocates memory buffers (in controller B) for the read data, maps the request to the appropriate disk drives, and initiates reads (data transfers) via the appropriate drive channel adaptor Drive CA from the disk drivers. In step 4, the drive channel adaptor Drive CA begins to transfer the data to the appropriate memory pool. This step facilitates future cache read hits for this data. In step 5, data is transferred to the host channel adaptor Host CA on Controller A that received the request. In step 6, Controller B directs command status to be returned through the originating channel adaptor on Controller A.

If the data requested by the read is already in the cache, the data transfer will occur from Controller B's cache to the originating channel adaptor on Controller A. No disk drive access is necessary in this case.

The method for processing a data transfer read request issued by a host computer or external device to a controller for a volume controlled or contained by that controller involves sending a read request to a host channel adaptor of the first storage controller, sending the read request to a CPU of the first storage controller and directing a drive channel adaptor of the first storage controller to transfer data from its associated memory to a remote memory controller which causes the data to be transferred from the associated memory of the drive channel adaptor to the requesting host computer or external device.

FIG. 3 shows a proxy data transfer write sequence. In step 1, a write request directed to a storage volume currently managed by Controller B is received by Controller A. In step 2, the write is routed from Controller A to Controller B. Controller B is now responsible for managing this request. Controller B allocates memory buffers for the request (including a mirror buffer on Controller A) and initiates the data transfer request from the host. In step 3, the originating host channel adaptor begins to transfer data to the appropriate memory pool via the remote memory controller RMC. The remote memory controller RMC may be on either controller. In this case, Controller A has the buffer for mirrored data and Controller B has the data for the original write data. In step 4, data is transferred to the appropriate remote memory controller RMC (and memory buffer) on the alternate controller.

In step 5, if the storage volume is configured for write-back caching, Controller B directs command status to be returned through the originating channel adaptor on Controller A.

In step 5, if the volume is configured for write-through caching, Controller B directs write completion to the disk drives before returning status. Write-through (store-through) caching provides a write operation to both the cache memory of the corresponding storage controller and the disk drives for achieving consistency between the data in the cache memory and the storage device. The contents of the cache memory and storage device are always identical so the two memories are always coherent.

The method of processing a data transfer write request issued by a host computer or external device to a controller in which the memory of the same controller is to accessed involves sending a write request to a host channel adaptor of the first storage controller, sending the write request to a CPU of the first storage controller and directing a remote memory controller to transfer data to the memory associated with the remote memory controller of the first storage controller.

It is believed that the virtual shared volume via proxy data transfer of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of processing a data transfer write request issued by a host computer or external device to one of first and second independent storage controllers, comprising the steps of:

sending a write request to a host channel adaptor of the first storage controller;

determining whether the write request is directed to a storage volume associated with the first storage controller or the second storage controller;

if it is determined that the write request is directed to the storage volume associated with the second storage controller, routing the write request from the first storage controller to the second storage controller;

if it is determined that the write request is directed to a memory associated with the second storage controller, routing the write request from the first storage controller to the second storage controller such that the second storage controller manages the write request;

allocating, by the second storage controller, memory buffers for the write request which includes allocating a mirror memory buffer on the first storage controller and initiating the data transfer write request from the requesting host computer or external device;

transferring, by the host channel adaptor of the first storage controller, data either to a remote memory controller of the second storage controller or a remote memory controller of the first storage controller for storage to a storage volume; and if the storage volume is configured for write-back caching, directing, by the second controller, a command status to be returned through the host channel adaptor of the first storage controller.

2. A method of processing a data transfer write request issued by a host computer or external device to one of first and second independent storage controllers, comprising the steps of:

sending a write request to a host channel adaptor of the first storage controller;

determining whether the write request is directed to a storage volume associated with the first storage controller or the second storage controller;

if it is determined that the write request is directed to the storage volume associated with the second storage controller, routing the write request from the first storage controller to the second storage controller;

if it is determined that the write request is directed to a memory associated with the second storage controller, routing the write request from the first storage controller to the second storage controller such that the second storage controller manages the write request;

allocating, by the second storage controller, memory buffers for the write request which includes allocating a mirror memory buffer on the first storage controller and initiating the data transfer write request from the requesting host computer or external device;

transferring, by the host channel adaptor of the first storage controller, data either to the remote memory controller of the second storage controller or a remote memory controller of the first storage controller for storage to a storage volume; and if the storage volume is configured for write-through caching, directing, by the second controller, completion of the data transfer to a disk drives before returning the status to the host channel adaptor of the first storage controller, wherein associated memory of all remote memory controllers is accessible by all other remote memory controllers, host channel adaptors, and drive channel adaptors.

* * * * *